US011102012B2

(12) United States Patent
Servant et al.

(10) Patent No.: US 11,102,012 B2
(45) Date of Patent: Aug. 24, 2021

(54) PROCESS FOR DIGITAL SIGNING OF A DOCUMENT WITH A PREDETERMINED SECRET KEY

(71) Applicant: IDEMIA IDENTITY & SECURITY FRANCE, Issy les Moulineaux (FR)

(72) Inventors: Victor Servant, Issy les Moulineaux (FR); Emmanuel Prouff, Issy les Moulineaux (FR); Herve Chabanne, Issy les Moulineaux (FR)

(73) Assignee: IDEMIA IDENTITY & SECURITY FRANCE, Issy les Moulineaux (FR)

( * ) Notice: Subject to any disclaimer, the term of this patent is extended or adjusted under 35 U.S.C. 154(b) by 403 days.

(21) Appl. No.: 15/986,753

(22) Filed: May 22, 2018

(65) Prior Publication Data
US 2018/0343124 A1 Nov. 29, 2018

(30) Foreign Application Priority Data

May 24, 2017 (FR) ...................................... 1754636

(51) Int. Cl.
*H04L 9/00* (2006.01)
*H04L 9/32* (2006.01)
(Continued)

(52) U.S. Cl.
CPC ............ *H04L 9/3252* (2013.01); *G06F 7/721* (2013.01); *G06F 7/727* (2013.01); *H04L 9/0643* (2013.01);
(Continued)

(58) Field of Classification Search
CPC ... H04L 9/3252; H04L 9/0643; H04L 9/0825; H04L 9/0861; H04L 2209/16; G06F 7/721; G06F 7/727
See application file for complete search history.

(56) References Cited

U.S. PATENT DOCUMENTS

| 5,479,511 A | 12/1995 | Naccache |
| 2009/0094464 A1 | 4/2009 | Futa et al. |

(Continued)

FOREIGN PATENT DOCUMENTS

| EP | 2884689 A2 * | 6/2015 | ........... H04L 9/0872 |
| FR | 3063857 A1 | 9/2018 | |
| WO | 2016/155565 A1 | 10/2016 | |

OTHER PUBLICATIONS

Qi Feng;Debiao He;Huaqun Wang;Neeraj Kumar;Kim-Kwang Raymond Choo; "White-Box Implementation of Shamir's Identity-Based Signature Scheme"; IEEE Systems Journal; Year:2020; vol. 14, Issue: 2; Publisher: IEEE; pp. 1820-1829 (Year: 2020).*

(Continued)

*Primary Examiner* — Kendall Dolly
*Assistant Examiner* — Courtney D Fields
(74) *Attorney, Agent, or Firm* — Womble Bond Dickinson (US) LLP

(57) ABSTRACT

A method for digital signing of a document using a predetermined secret key. An initial internal state is determined by application to a condensate of the document of a first white box implementation of generation of a main nonce; then a modular sum of the main nonce and of a predetermined constant. The method also determines a first internal state by application to the initial internal state of a first modular arithmetic operation, then of a modular product with exponentiation of the predetermined constant. The method then determines a second internal state by application to said condensate of a second white box implementation of generation of the main nonce; and a second modular arithmetic operation function of the first internal state, of the main signature nonce and of the secret key. It then generates a digital signature of the document from the first internal state and the second internal state.

19 Claims, 1 Drawing Sheet

(51) Int. Cl.
*H04L 9/06* (2006.01)
*H04L 9/08* (2006.01)
*G06F 7/72* (2006.01)

(52) U.S. Cl.
CPC .......... *H04L 9/0825* (2013.01); *H04L 9/0861* (2013.01); *H04L 2209/16* (2013.01)

(56) References Cited

U.S. PATENT DOCUMENTS

| | | | | |
|---|---|---|---|---|
| 2013/0024699 A1* | 1/2013 | Muir | ..................... | H04L 9/3066 |
| | | | | 713/176 |
| 2015/0270950 A1* | 9/2015 | Michiels | ................. | H04L 9/002 |
| | | | | 380/28 |
| 2016/0239267 A1 | 8/2016 | Bos et al. | | |
| 2016/0328543 A1 | 11/2016 | Hoogerbrugge et al. | | |

OTHER PUBLICATIONS

Preliminary Research Report received for French Application No. 1754636, dated Jan. 11, 2018, 4 pages (1 page of French Translation Cover Sheet and 3 pages of original document).
European Search Report received for EP Patent Application No. 18173873.3, dated Jun. 19, 2018, 5 pages of Original Document Only.

\* cited by examiner

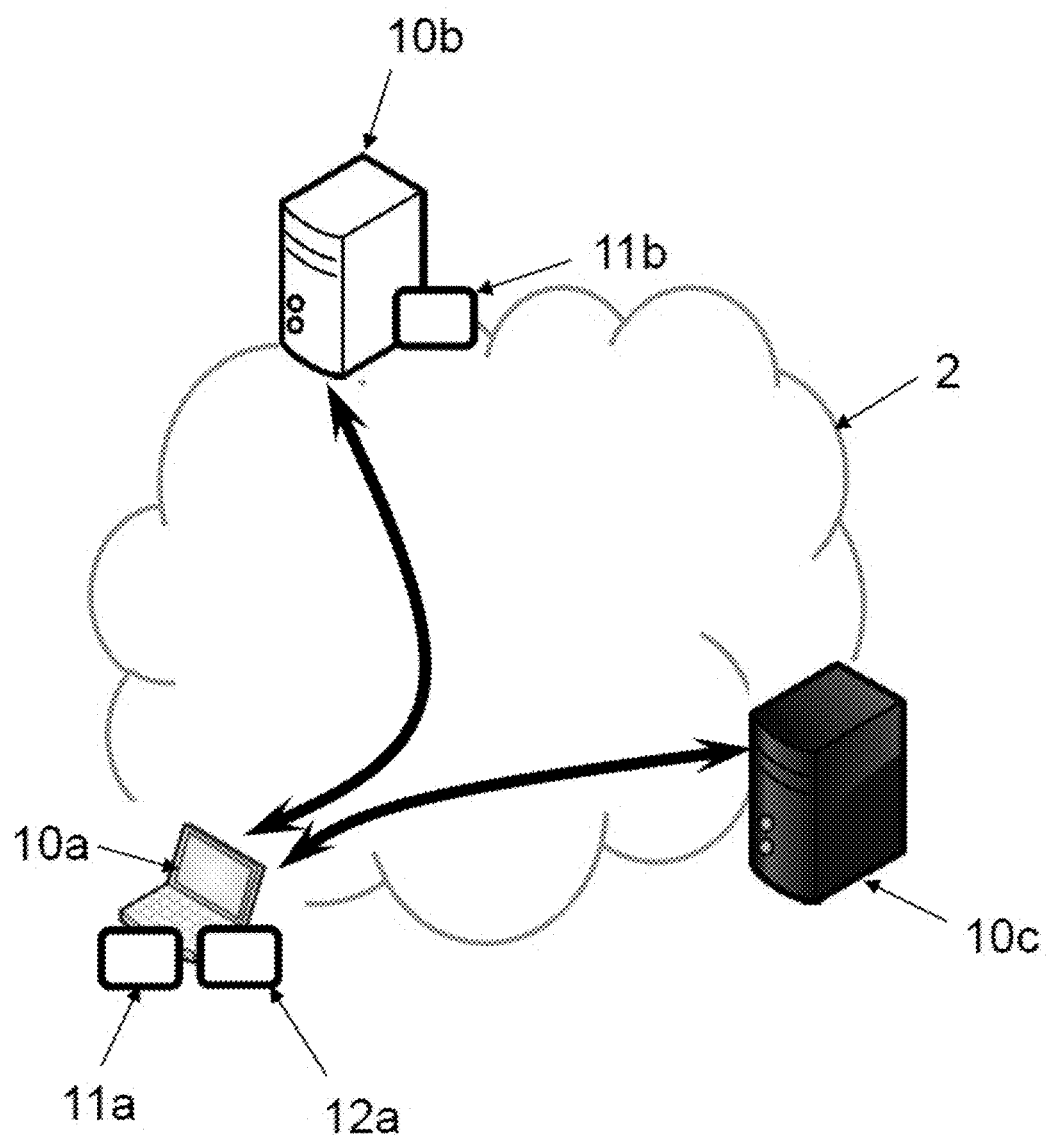

PROCESS FOR DIGITAL SIGNING OF A DOCUMENT WITH A PREDETERMINED SECRET KEY

GENERAL TECHNICAL FIELD

The present invention relates to the field of cryptography, and in particular a signing method of «white box» type.

PRIOR ART

A function is considered as a «black box» when there is no access to its internal operation, i.e. its inputs and its outputs can be known, but not its secret parameters or its intermediate states.

Cryptographic algorithms (for example for encryption or signing) are conventionally supposed to be black boxes when their reliability is being evaluated (resistance to attacks).

The black box hypothesis imposes a major restriction on storage and handling of these parameters. But tools have recently been published to enable automated attacks on hardware implementation, attacks known as side-channel attacks or fault attacks.

Today for many cases of use including mobile payments, it is necessary to deploy cryptographic algorithms by making the fewest assumptions possible on the security of the target hardware. Secure storage and handling of secret parameters must be ensured at the application level.

Cryptography known as white box aims to respond to this challenge by proposing implementations of cryptographic algorithms which are supposed to make extraction of secrets impossible, even in case of attack giving the attacker complete access to software implementation of the algorithm. More precisely, a function is considered as a «white box» when its mechanisms are visible and comprise its operation. In other terms, the direct assumption is made that the attacker has access to all he wants (the binary is completely visible and modifiable by the attacker and the latter has full control of the platform of execution). The implementation itself is consequently the sole line of defence. This is about «white box implementation» of an elementary calculation of the algorithm when it comes to representing this calculation in a secure form avoiding having the keys used plain, for example by showing calculation by a table stored in memory.

Application US2016/328543 has for example proposed a method aimed at hiding the inputs and the outputs of a modular exponentiation function, which improves the security of cryptographic algorithms such as RSA («Rivest, Shamir, Adleman»).

However, it has been shown that this method was inadequate in ensuring satisfactory protection of the algorithm of signature DSA («Digital Signing algorithm»).

The calculation of a signature DSA presupposes that a public key (p, q, g, y) and a private key x have been associated with the user. The process of generating these keys comprises the following different steps:
  Selecting a first number p of length L such that $512 \leq L \leq 1024$, and L is divisible by 64
  Selecting a first number q of 160 bits, such that $p-1=qc$, with c a whole number
  Selecting h, with $1 < h < p-1$ so as to construct g such that $g = h^c \mod p > 1$
  Generating randomly a x, with $0 < x < q$
  Calculating $y = g^x \mod p$ DSA signing of a message m commences with calculation of hash H(m) (by means of a standard hashing function such as SHA256) then continues with calculation of two values $s_1$ and $s_2$ such as:
  $s_1 = (g^k \mod p) \mod q$
  $s_2 = (H(m) + s_1 x) k^{-1} \mod q$
where k is a datum known as nonce (i.e. a single-use arbitrary number, from the expression «number used once»), which must be drawn randomly for each new signature.

The signature is $(s_1, s_2)$.

As explained, white box implementations of each of the calculation functions of the internal states $s_1$ and $s_2$ can be obtained by hiding the modular exponentiation.

However, the same application of the white box implementation of $s_2$ to two different data z and z' (for example the condensates of two different messages) while forcing reuse of a same nonce k (normally impossible except in a white box attack or with access to the hardware) allows via calculation of $s_2(z) - s_2(z')$ access to x. This is called a «restart attack».

It would consequently be preferable to have a new «white box» signature solution using the standard mechanism such as DSA which is completely resistant to all known attacks.

PRESENTATION OF THE INVENTION

According to a first aspect, the present invention relates to a method for digital signing of a document using a predetermined secret key, comprising a data-processing unit of equipment performing steps of:
  (a) determination of an initial internal state by application to a condensate of the document obtained by a given hashing function of a first white box implementation of:
    generation of a main nonce from said condensate; then
    a modular sum of the main nonce and of a predetermined constant;
    said first white box implementation being stored on data-storage unit of the equipment;
  (b) determination of a first internal state by application to the initial internal state of a first modular arithmetic operation, then of a modular product with an exponentiation of the predetermined constant;
  (c) determination of a second internal state by application to said condensate of a second white box implementation of:
    generation of the main nonce from said condensate; and
    a second modular operation function of the first internal state, of the main nonce and of the secret key;
    said second white box implementation being stored on the data-storage means of the equipment;
  (d) generation of a digital signature of the document from the determined first internal state and of the second internal state.

According to other advantageous and non-limiting characteristics:
  said second modular arithmetic operation comprises a modular inversion of the main nonce;
  said second modular arithmetic operation is $z \mapsto (z + s_1 x) k^{-1} \mod q$, where $s_1{}^i$ is the first internal state, k the main nonce, x the secret key and q a constant;
  said modular product with an exponentiation of the predetermined constant is $z \mapsto z g^{-K} \mod q$;
  said first modular arithmetic operation is $z \mapsto (g^z \mod p) \mod q$, where g and p are constants;
  said modular sum with the predetermined constant is $z \mapsto k + K \mod p$;

the signature is the couple of the first and second internal states;

the first modular arithmetic operation is visibly executed by the data-processing unit of the equipment;

said modular product with an exponentiation of the predetermined constant is executed by application of a third white box implementation stored on the data-storage unit of the equipment;

the method also comprises steps of:
(a') determination of a third internal state by application to a condensate of the document obtained by a given hashing function of a fourth white box implementation of:
   generation of the main nonce and of an auxiliary nonce from said condensate; then
   the modular product of the main nonce and of the auxiliary nonce;
   said fourth white box implementation being stored on the data-storage means of the equipment;
(b') determination of a fourth internal state by modular inversion of the third internal state;

steps (a') and (b') are conducted prior to step (c), said second white box implementation also implementing:
   generation of the auxiliary nonce from said condensate; and
   the modular product of the fourth internal state and of the auxiliary nonce so as to obtain the value of the modular inverse of the main nonce;

step (b') is visibly executed by the data-processing unit of the equipment;

said second white box implementation also implements the modular product of the auxiliary nonce and of said value of the modular inverse of the main nonce for verification.

The method comprises a prior step (a0) of generation of said white box implementations by a data-processing unit of a server, and their transmission to the equipment.

step (a0) comprises prior generation of constants p, q, according to the algorithm DSA;

step (a0) also comprises prior generation of the secret key and of a public key associated as a function of the constants p, q, g;

said white box implementations utilise a Residue Number System, RNS, for executing said modular arithmetic operation;

the method comprises a subsequent step (d) of association by the data-processing unit of the equipment of the generated digital signature with the document so as to form the signed document.

According to a second and a third aspect, the invention proposes a computer program product comprising code instructions for execution of a method according to the first aspect for digital signing of a document with a predetermined secret key; and storage medium readable by computer equipment on which a computer program product comprises code instructions for execution of a method according to the first aspect for digital signing of a document with a predetermined secret key.

PRESENTATION OF FIGURES

Other characteristics and advantages of the present invention will emerge from the following description of a preferred embodiment. This description will be given in reference to the appended drawings, wherein:

FIG. 1 is a diagram of an architecture for execution of the method according to the invention.

DETAILED DESCRIPTION

Architecture

In reference to FIG. 1, is proposed a «white box» method for signing a document performed by equipment $10a$ such as a mobile terminal (smartphone, touch tablet, etc.), i.e. equipment having no particular secure hardware and which can be hacked in particular on hardware implementation, and for which the white box approach is particularly worthwhile.

The equipment $10a$ comprises a data-processing unit $11a$ (a processor) and a data-storage unit $12a$ (a memory, flash for example).

The equipment $10a$ is for example connected to a server $10b$ for example via the internet network $20$. It might also receive from this server $10b$ (for example that of a provider of security solutions) cryptographic objects (to be described later) containing secrets which will be stored in the memory $12a$ and used for executing the present method.

The equipment $10a$ itself can be connected to other third-party servers $10c$ to which it could transmit the signed document once it will have generated the digital signature.

Signing Method

The present method is definitely a method of «generation of digital signature of a document». This means that it obtains the digital signature of the document only and not yet the «signed document», i.e. association of the document original and the signature, generally in any container.

«Digital signature» of a document means the classic definition of this term, specifically a cryptographic primitive for identifying the signatory and ensuring that the document has not been altered from the time when the signature was produced and is definitely the original document (throughout the present description the document from which the condensate has really come will be designated as «original»). This cryptographic object generally consists of an encrypted form of the condensate of the document by way of a function of asymmetric encryption: the signatory utilises a private key and everyone can verify the signature by way of a public key (comparing the condensate contained in the signature and a recalculated condensate).

It is understood that the present method is a novel implementation of known algorithms using modular arithmetic operations (i.e. operations comprising modulo calculations, especially modular exponentiations), in particular DSA which is a current standard and the example of which will be taken throughout the description. More precisely, it does not propose a novel signing strategy, but rather a novel way of handling data within the algorithm which is resistant to all «white box» hardware attacks.

The document is associated with a condensate obtained by a given hashing function.

As explained, a hashing function inputs a message of arbitrary size (original document) and produces a condensate of fixed size associated with this message. Here, said given hashing function is advantageously a function called cryptographic, that is, with supplementary properties: the condensate is statistically well distributed throughout all the arrival values, and it is impossible in reasonable time to find two messages which have the same condensate (resistance to collisions) and from the condensate a message cannot be found which has produced this value (resistance to calculation of pre-image).

The example of functions of the SHA family («Secure Hash Algorithm») will be taken, standardised by the NIST («National Institute of Standards and Technology»), in particular the sub-families SHA-1 or SHA-2 (especially SHA-256).

Principle

For the same pair of public/private keys, patent application FR1751894 has proposed having several precalculated values of a first internal state $s_1^i$ each for a nonce $k_i$, then a white box implementation $WB_i$ of a modular arithmetic operation used by the signing algorithm for each of the nonces $k_i$, said modular arithmetic operation being indeed a function of the first internal state $s_1^i$, of the nonce $k_i$ and of the secret key x. It is recalled that the «white box implementation» of an operation means a representation of the operation which does not allow access to the internal states or parameters when the operation is executed (by application of the white box implementation to the input data).

In this way, a set of couples $\{(s_1^i, WB_i)\}_{i \in [[0,n-1]]}$ of the first internal state $s_1^i$ and of the white box implementation $WB_i$ of the modular arithmetic operation is predefined and stored on the data-storage unit 12a of the equipment 10a.

In other terms, with fixed keys public/private, each couple $(s_1^i, WB_i)$ is determined entirely by the nonce $k_i$: drawing a nonce is equivalent to drawing a couple. The nonce $k_i$ therefore is not an input datum of the white box implementation $WB_i$ but an «embedded» parameter which an attacker cannot access.

This solution fully satisfies, as the expected properties of the whitening of application ensure that observation of the execution of the white box implementation $WB_i$ does not discover the values of the secret key x and of the nonce $k_i$ buried in the calculation.

However, security against restart attacks is complete only if there is assurance that the $k_i$ are single-use only. For this there must be provision for authorising the use of each $WB_i$ once only to prevent accessing $k_i$;
eliminate white box implementations $WB_i$ from the data-storage unit 12a after use.

But despite everything this could turn out circumventable if an attacker had access not only to each internal state, but also to the contents of the memory (memory attack). The attacker could extract one of the $WB_i$ and reinject it several times into the memory so that it is in several copies, which would indirectly allow its reuse and a possibility of accessing $k_i$.

The present method offers all the advantages of this first method (complete white box protection) and eliminates any possibility of memory attack.

For this it proposes using not a plurality of precalculated nonces $k_i$, but instead a calculation function on the fly of a nonce k (to be called «main nonce» in the rest the description) from the condensate of the message, and for the same pair of public/private keys using a first white box implementation $WB_0$ of:

generation of the main nonce k from said condensate; then
a modular sum (i.e. a sum to the result of which a modulo is applied) of the main nonce k and of a predetermined constant K (buried in the white box implementation).

Indeed, the main nonce k shall not visibly appear, which is why it should be combined with the predetermined constant K so as to obtain an a «initial» internal state $s_0$.

As will be shown, it does appear possible to effectively calculate the first internal state $s_1$ from this initial internal state $s_0$ by a first modular arithmetic operation used by the signing algorithm, followed by a modular product (i.e. a product to the result of which a modulo is applied) with an exponentiation of the predetermined constant K (which, as will be seen, will eliminate the contribution of the predetermined constant K and produce the value which there would have been by directly applying said modular arithmetic operation used by the signing algorithm to the main nonce k «as such», without the need for it to be revealed).

As will be evident, more or less partially white box implementation (the third white box implementation noted $WB_{s1}$) of this calculation is preferable (various embodiments will be seen) at minimum for keeping the predetermined constant K secret (buried).

Next, the second internal state $s_2$ can be calculated from the first internal state $s_1$ by using on the condensate a modular arithmetic operation used by the signing algorithm, a function of the first internal state $s_1$, of the main nonce k and of the secret key x.

Here, communicating the main nonce k can be avoided by recalculating it independently from the condensate.

For this is applied to said condensate a second white box implementation $WB_{s2}$ of:

generation (again) of the main nonce k from said condensate (by the same function of course); and
the second modular arithmetic operation;

By way of reminder, a «white box implementation» of an operation/set of operations, means representation of the operation/set of operations which does not allow access to the internal states or the parameters when executed (by application of the white box implementation to the input data). The internal parameters are called buried.

In this way, the white box implementations $WB_0$, $WB_{s1}$, $WB_{s2}$ (and potentially another as will be seen) are predefined and stored on the data-storage unit 12a of the equipment 10a.

In other terms, with fixed public/private keys, there are no more couples $(s_1^i, WB_i)$ entirely determined by nonces $k_i$ (nonce $k_i$ is not an input datum of the white box implementation $WB_i$ but a buried parameter), but a combination of a white box implementation $WB_0$ dedicated to generating and hiding a single main nonce k associated with a message (it is impossible to have two messages leading to the same main nonce k) and one or more white box implementations of the calculation functions of the internal states $s_1$ and $s_2$ hiding the modular arithmetic operation, modified so as to consider the fact that the nonce is hidden.

As preferred, said white box implementations $WB_0$, $WB_{s1}$, $WB_{s2}$ (and others) are generated by the data-processing unit 11b of the server 1b and are sent for storage to the equipment 10a in a prior step (a0).

The expected properties of the application whitening ensure that observation of the execution of the white box implementations $WB_0$, $WB_{s1}$, $WB_{s2}$ must not allow finding the values of the secret key x, of the nonce k, and of the constant K buried in the calculation.

Preferred Embodiment

In the example where the signing algorithm complies with DSA, then $s_1$ can be equal to $(g^k \mod p) \mod q$, where g, p and q are constants (in particular first numbers for p and q).

This means that said first modular arithmetic operation is advantageously $z \mapsto (g^z \mod p) \mod q$, where g and p are constants.

Similarly, said second modular arithmetic operation represented by the second white box implementation $WB_{s2}$ can comprise modular inversion of the main nonce k (i.e. use $k^{-1}$ calculated from k), and especially be $z \mapsto (z+s_1 x)k^{-1} \mod q$. It can easily be verified that this calculation corresponds to that of the $s_2$ associated with $s_1$, for a value of condensate z of the message.

In this respect, said modular sum with the predetermined constant K is advantageously $z \mapsto k+K \bmod p$, and said modular product with exponentiation of the predetermined constant K which suit the first modular arithmetic operation is advantageously $z \mapsto z \cdot g^{-K} \bmod q$.

In general, it could be borne in mind that in a DSA context the «modular sums (or additions)» are sums of modulo terms p, and the «modular products (or multiplications)» are products of modulo terms q.

By applying all the formulas proposed above, a condensate is $z=H(m)$:

$s_0 = k(H(m))+K \bmod p$;

Applying the first operation therefore produces the internal state $s_{temp} = (g^{k(H(m))+K} \bmod p) \bmod q = g^K \, g^{k(H(m))} \bmod p \bmod q$;

Thereby $s_1 = s_{temp} \cdot g^{-K} \bmod q = g^{k(H(m))} \bmod p \bmod q$;

And finally $s_2 = (H(m)+s_1 x)k(H(m))^{-1} \bmod q$.

The values p, q, g are preferably predetermined according to the DSA algorithm, in particular by the data-processing unit 11b of the server 10b during the prior step (a0).

It is recalled in DSA that (p, q, g, y) forms a public key generated with a private key x as follows:

Select a first number p of length L such that $512 \leq L \leq 1024$, and L is divisible by 64

Select a first number q of 160 bits, such that $p-1=qc$, with c a whole number

Select h, with $1<h<p-1$ so that $g=h^c \bmod p>1$

Generate randomly a x, with $0<x<q$

Calculate $y=g^x \bmod p$

The skilled person will however understand that the present method is not limited to DSA and is satisfactory for any signing algorithm comprising a modular arithmetic operation function of a first internal state, of a nonce and of a secret key.

With respect to the function $z \mapsto k$ which allows generation of the main nonce k, it advantageously uses a secret sk which is associated with it uniquely, and preferably uses an encryption algorithm, in particular Triple DES. This function (and the secret) are shared between all the white box implementations needing to find the nonce k.

As will be evident, any auxiliary nonce k' can be obtained exactly in the same way by using a different secret sk'.

Execution

The present method is performed by the data-processing unit 11a of the equipment 10a and commences by a step (a) for determining the initial internal state $s_0$ by application to a condensate H(m) of the document m (obtained by a given hashing function, such as SHA256) of the white box implementation $WB_0$ stored on the data-storage unit 12a of the equipment 10a of:

generation of the main nonce k from said condensate H(m); then a modular sum of the main nonce k and of the predetermined constant K;

The sole input of the first white box implementation $WB_0$ is the condensate H(m) and the sole output $s_0$ is the result of the modular sum.

In a step (b) the first internal state $s_1$ is determined by application to the initial internal state $s_0$ of the first modular arithmetic operation, then of the modular product with an exponentiation ($g^{-K}$) of the predetermined constant K.

As explained, this step (b) can have several embodiments.

In a first embodiment, the whole calculation (application to the initial internal state $s_0$ of the first modular arithmetic operation, then of the modular product with exponentiation of the predetermined constant K) is the object of a third white box implementation $WB_{s1}$. However, to the extent where the first modular arithmetic operation is typically doubly modular exponentiation (modulo p then q), the execution is long is complex.

Thus, alternatively, it can be allowed to have as explained earlier an intermediate internal state $s_{temp}$ (such that $s_{temp}$ is determined by application to the initial internal state $s_0$ of the sole first modular arithmetic operation, and $s_1$ is determined by application to the intermediate internal state $s_{temp}$ of the sole modular product with exponentiation of the predetermined constant K), to the extent where this internal state brings no sensitive information since the nonce k is hidden by K.

As is preferred, the optional third white box implementation $WB_{s1}$ implements only the modular product with the exponentiation of the predetermined constant K. In other terms the first modular arithmetic operation is executed visibly (i.e. "in clear", that is non-securely) by the data-processing unit 11a of the equipment 10a (in other words this operation is not whiteboxed, and internal states are let accessible by an attacker) since it is the least sensitive and that which is the more complex.

The sole input of the third white box implementation $WB_{s1}$ is the intermediate internal state $s_{temp}$ and the sole output $s_1$ is the result of the modular product. The third white box implementation is very light, as exponentiation of the predetermined constant K (and if needed its modulo) can-be precalculated and buried directly.

Next, in a third step (c) the second internal state $s_2$ is determined by application to said condensate H(m) of the second white box implementation $WB_{s2}$ stored on the data-storage unit 12a of the equipment of:

«re-generation» of the main nonce k from said condensate (it is understood that the same function is executed as in the first white box implementation $WB_0$, in other terms it buries the same secret sk); and the second modular operation function of the first internal state $s_1$, of the main nonce k and of the secret key x (buried);

The inputs of the second white box implementation $WB_{s2}$ are the condensate H(m) and the first internal state $s_1$ (and as will be seen later possibly a fourth internal state $s_4$), and the output $s_2$ is the result of the second modular arithmetic operation.

From there, in a fourth step (c) the digital signature of the document can be generated from the first internal state $s_1$ of the drawn couple and of the second internal state $s_2$ determined at step (b). In the preferred example of DSA, the signature is simply ($s_1$, $s_2$).

Additionally, the method can comprise a subsequent association step (d) by the data-processing unit 11a of the equipment 10a of the digital signature with the document so as to form the signed document. The equipment 10a can legally take advantage of this digital signature with other entities (servers 10c).

As preferred, when the equipment 10a is delegated execution of the first modular arithmetic application, it is interesting to be able to prove that the intermediate internal state $s_{temp}$ has not been altered, in other terms that the value of the main nonce k on the basis of which $s_{temp}$ has been calculated is definitely the original.

It is noted indeed that if signing of the same message is requested twice, then the same nonce k will be generated in both cases. An attacker controlling clear execution of the first arithmetical operation could re-request signing of the same message, then «cheat» on the value of $s_{temp}$ sent back the second time (calculate $(g^{k(H(m))+K}+\delta \mod p) \mod q$, where $\delta$ is an error added knowingly, equivalent to modifying k).

This could deceive the second white box implementation $WB_{s2}$ which in turn will send back a false value of $s_2$. Knowing the true value of $s_2$ obtained during the first signing and the value of $\delta$, it would be possible in some cases to access k.

In this way, said third white box implementation $WB_{s1}$ advantageously also implements verification that the received value $s_{temp}$ is coherent, given the values of k and K. More precisely, it is much lighter in terms of calculating power to verify the result of the exponentiation modular of k+K than to perform this calculation, which is why verification can be implemented as white box.

Known techniques of delegation of calculation to a third party can be mentioned, which include various verification of this calculation (for example described in the following article: https://epnnt.iacr.org/2015/206).

Also, the technique of a «small moduli» which has a low probability of false positive but is very light can be used. The idea is that the third white box implementation $WB_{s1}$ can itself perform the delegated calculation but on the basis of small moduli (much easier than the original calculation), and, by reducing the value received from $s_{temp}$ by these small moduli, verify that the third-party entity (equipment 10a) has performed the expected calculation.

For this, the third white box implementation $WB_{s1}$ must also implement «re-generation» of the main nonce k (because it needs it to make this verification) from said condensate (it is understood that the same function is performed as in the first white box implementation $WB_0$ or the second white box implementation $WB_{s2}$, in other terms it buries the same secret sk).

In addition or alternatively, a counter is implemented to limit or prevent reuse of at least the first white box implementation $WB_0$ with the same set of parameters.

In this way, the counter preferably takes the form of a list of messages for which the signature has already been asked, i.e. having a condensate already used as input datum of the first white box implementation $WB_0$ (this list is typically a list of condensates), advantageously readable only by this first white box implementation $WB_0$ (for example by being encrypted) so as to prevent it from being handled fraudulently. More precisely, each time the method is executed, the first white box implementation $WB_0$ accesses the list, verifies whether the received condensate forms part of the list. If yes, the method is interrupted, and if no the received condensate is added to the list and the method is continued.

In the event where the second white box implementation $WB_{s2}$ already implements verification of $s_{temp}$, it should be noted that it is possible to have tolerance and for example authorise one or two «re-signings» of the same message. In fact, the probability that verification even at small modulos gives a false positive is very low, and a very large number of times signing the same message would have to be executed to hope to make such a false positive. Each condensate is for this associated in said list with a whole number designating the number of remaining uses (or inversely already consumed) of the first white box implementation $WB_0$. So each time the method is executed, the first white box implementation $WB_0$ accesses the list, verifies whether the received condensate forms part of the list and compares the associated whole number to a threshold (zero if the remaining number of uses is counted, or a maximum predetermined number of uses if those uses already consumed are counted). If the condensate forms part of the list and if the threshold is reached the method is interrupted. If not, the method is continued and:

either the condensate received does not form part of the list and it is added to it with an initial value given to the associated whole number (said maximum predetermined number of uses if the number of remaining uses is counted, or zero if the uses already consumed are counted), or the condensate received forms part of the list and the threshold is not reached and is decremented (respectively incremented).

It should be noted that an embodiment is possible combining verification of $s_{temp}$, and prohibiting any «resigning» of the same message. It lends unequalled security, since the second white box implementation $WB_{s2}$ cannot be misled, even by chance.

Auxiliary Nonce

As explained, in the preferred embodiment the second modular arithmetic operation utilises the inverse value of the main nonce k. But to the extent where k is not precalculated, the value of $k^{-1}$ has to be calculated directly, and application of the white box implementation $WB_{s2}$ for executing such a modular inversion can be long the white box implementation.

The present method proposes having this inversion calculated astutely visibly (i.e. non-securely) without disclosing the value of k, by using a second nonce k' called auxiliary nonce, generated in the same conditions.

For this the method advantageously comprises additional steps (a') and (b') which are preferably conducted prior to step (c), but are independent of steps (a) and (b).

In step (a') a third internal state $s_3$ is determined by application to a condensate of the document obtained by a given hashing function of a fourth white box implementation $WB_0'$ stored on the data-storage unit 12a of the equipment 10a, of:

generation of the main nonce k and of the auxiliary nonce k' from said condensate H(m); then the modular product of the main nonce k and of the auxiliary nonce k'.

In the example where the signing algorithm complies with DSA, said modular product is advantageously $z_1$, $z_2 \mapsto z_1 \cdot z_2 \mod q$ (it is the same product as at step (b)), such that $s_3=k(H(m)) \cdot k'(H(m)) \mod q$.

In step (b') a fourth internal state $s_4$ is determined by modular inversion of the third internal state $s_3$. In other terms $s_4=s_3^{-1} \mod q=1/k(H(m)) \cdot k'(H(m)) \mod q$.

As for step (b), this step (b') is preferably executed visibly (i.e. non-securely) by the data-processing unit 11a of the equipment 10a, since as explained a modular arithmetic operation is a minimally sensitive operation (as k is hidden) and highly complex.

At this stage, with k' known, $k^{-1}$ can easily be retrieved. In this respect, said second white box implementation $WB_{s2}$ advantageously also implements:

generation of the auxiliary nonce k' from said condensate; and the modular product of the fourth internal state $s_4$ and of the auxiliary nonce k' so as to obtain the value of the modular inverse of the main nonce k.

Said modular product advantageously has again the same form, such that if $s_5$ is noted as the result of this product, then there is $s_5=s_4 \cdot k'(H(m)) \mod q=1/k(H(m)) \mod q$.

This gives very light white box implementation of the calculation of the modular inverse of k.

It should be noted that use of the auxiliary nonce has other interest. To the extent where processings can be visibly executed, it is interesting to be able to prove that the internal intermediate state $s_4$ has not been altered, in other terms that the value of the main nonce k on the basis of which $s_4$ has been calculated is definitely the original, in the same way as for $s_{temp}$.

In this way, said second white box implementation $WB_{s2}$ also advantageously implements the modular product of the auxiliary nonce k and of said value of the modular inverse of the main nonce k for verification (that $s_5$ is the inverse of k in Z/qZ).

More precisely, if said value of the modular inverse of the main nonce k is what it pretends to be, in other terms that $s_5 = k^{-1}$ mod q, then $k \cdot s_5$ mod $q = k \cdot k^{-1}$ mod $q = 1$ mod q.

White Box Implementation

Carrying out white box implementations of modular arithmetic operations is familiar to the skilled person.

However, application of the white box implementation for executing the corresponding operation can be long, in particular if said modular arithmetic operation comprises modular exponentiations.

In this respect, said white box implementations $WB_i$ preferably utilise a Modular Representation System («Residue Number System», RNS) to execute said modular arithmetic operation.

More precisely, the implementation principle RNS decomposes from modulo calculations a given value into modulo calculations of small first numbers whereof the product is larger than said given value (because of the Chinese theorem).

The skilled person could proceed for example according to application US2016/239267.

Alternatively, it is possible to have the final part of the calculation left visible, by using the principle of U.S. Pat. No. 5,479,511. For example, in the case of $s_2$, white box implementation can easily calculate $s_2' = (H(m) + s_1 x)(k^{-1}$ mod $q) + r \cdot q$, with r any number of length equal to q, and the data-processing unit 11a of the equipment 10a calculates $s_2 = s_2'$ mod q.

Computer Program Product

According to a second and a third aspect, the invention relates to a computer program product comprising code instructions for execution (in particular on the data-processing unit 11a of the equipment 10a) of a method according to the first aspect of the invention for digital signing of a document with a secret key x predetermined, and storage medium readable by computer equipment (a memory 12a of the equipment 10a) containing this computer program product.

The invention claimed is:

1. A method for digital signing of a document using a predetermined secret key (x), comprising performing by a data-processing unit of equipment steps of:
 (a) determination of an initial internal state ($s_0$) by application to a condensate of the document obtained by a given hashing function, of a first white box implementation ($WB_0$) of:
  generation of a main nonce (k) from said condensate; then
  a modular sum of the main nonce (k) and of a predetermined constant (K);
 said first white box implementation ($WB_0$) being stored on a data-storage unit of the equipment;
 (b) determination of a first internal state ($s_1$) by application to the initial internal state ($s_0$) of a first modular arithmetic operation, then of a modular product with an exponentiation of the predetermined constant (K);
 (c) determination of a second internal state ($s_2$) by application to said condensate of a second white box implementation ($WB_{s2}$) of:
  generation of the main nonce (k) from said condensate; and
  a second modular operation function of the first internal state ($s_1$), of the main nonce (k) and of the secret key (x);
 said second white box implementation ($WB_{s2}$) being stored on the data-storage unit of the equipment;
 (d) generation of a digital signature of the document from the determined first internal state ($s_1$) and of the second internal state ($s_2$); and
 further comprising executing said modular product with exponentiation of the predetermined constant (K) by application of a third white box implementation ($WB_{s1}$) stored on the data-storage unit of the equipment.

2. The method according to claim 1, wherein said second modular arithmetic operation comprises a modular inversion of the main nonce (k).

3. The method according to claim 2, wherein said second modular arithmetic operation is $z \mapsto (z + s_1 x) k^{-1}$ mod q, where $s_1^i$ is the first internal state, k the main nonce, x the secret key and q a constant.

4. The method according to claim 3, wherein said modular product with an exponentiation of the predetermined constant (K) is $z \mapsto zg^{-K}$ mod q.

5. The method according to claim 3, wherein said first modular arithmetic operation is $z \mapsto (g^z$ mod p) mod q, where g and p are constants.

6. The method according to claim 5, wherein said modular sum with the predetermined constant (K) is $z \mapsto k + K$ mod p.

7. The method according to claim 1, wherein the signature is the couple ($s_1, s_2$) of the first and second internal states.

8. The method according to claim 1, further comprising executing the first modular arithmetic operation by the data-processing unit of the equipment.

9. The method according to claim 1, comprising also steps of:
 (a') determination of a third internal state ($s_3$) by application to a condensate of the document obtained by a given hashing function of a fourth white box implementation ($WB_0'$) of:
  generation of the main nonce (k) and of an auxiliary nonce (k') from said condensate; then
  the modular product of the main nonce (k) and of the auxiliary nonce (k');
 said fourth white box implementation ($WB_0'$) being stored on the data-storage unit of the equipment;
 (b') determination of a fourth internal state ($s_4$) by modular inversion of the third internal state ($s_3$).

10. The method according to claim 2 in combination with claim 9, wherein steps (a') and (b') are conducted prior to step (c), said second white box implementation ($WB_{s2}$) implementing also:
 generation of the auxiliary nonce (k') from said condensate; and
 the modular product of the fourth internal state ($s_4$) and of the auxiliary nonce (k') to obtain the value of the modular inverse of the main nonce (k).

11. The method according to claim 10, wherein step (b') is visibly executed by the data-processing unit of the equipment.

12. The method according to claim 10, wherein said second white box implementation ($WB_{s2}$) implements also the modular product of the auxiliary nonce (k) and of said value of the modular inverse of the main nonce (k) for verification.

13. The method according to claim 1, comprising a prior step (a0) of generation of said white box implementations ($WB_0$, $WB_0'$, $WB_{s1}$, $WB_{s2}$) by a data-processing unit of a server, and their transmission to the equipment.

14. The method according to claim 6, wherein step (a0) comprises prior generation of the constants p,q,g according to a Digital Signature Algorithm (DSA).

15. The method according to claim 14, wherein step (a0) also comprises prior generation of the secret key (x) and of an associated public key as a function of the constants p, q, g.

16. The method according to claim 1, wherein said white box implementations ($WB_0$, $WB_0$, $WB_{s1}$, $WB_{s2}$) utilise a Residue Number System, RNS, to execute the modular sums or products.

17. The method according to claim 1, comprising a subsequent association step (d) by the data-processing unit of the equipment associating the generated digital signature with the document.

18. A non-transitory computer-readable storage medium storing a computer program product comprising code instructions for digital signing of a document using a predetermined secret key (x), which code instructions when executed by a data-processing unit:
   a) determine an initial internal state ($s_0$) by application to a condensate of the document obtained by a given hashing function, of a first white box implementation ($WB_0$) of:
      generation of a main nonce (k) from said condensate; then
      a modular sum of the main nonce (k) and of a predetermined constant (K);
      said first white box implementation ($WB_0$) being stored on a data-storage unit of the equipment;
   b) determine a first internal state ($s_1$) by application to the initial internal state ($s_0$) of a first modular arithmetic operation, then of a modular product with an exponentiation of the predetermined constant (K);
   c) determine a second internal state ($s_2$) by application to said condensate of a second white box implementation ($WB_{s2}$) of:
      generation of the main nonce (k) from said condensate; and
      a second modular operation function of the first internal state ($s_1$), of the main nonce (k) and of the secret key (x);
      said second white box implementation ($WB_{s2}$) being stored on the data-storage unit of the equipment;
   d) generate a digital signature of the document from the determined first internal state ($s_1$) and of the second internal state ($s_2$); and
   further comprising executing said modular product with exponentiation of the predetermined constant (K) by application of a third white box implementation ($WB_{s1}$) stored on the data-storage unit of the equipment.

19. The method according to claim 13, wherein step (a0) comprises prior generation of the constants p, q, g according to a Digital Signature Algorithm (DSA).

* * * * *